United States Patent
McAuliffe et al.

(10) Patent No.: US 6,926,490 B2
(45) Date of Patent: Aug. 9, 2005

(54) SELF-ACTUATED BEARING COOLING FLOW SHUT-OFF VALVE

(75) Inventors: Christopher McAuliffe, Windsor, CT (US); John M. Dehais, Windsor, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 159 days.

(21) Appl. No.: 10/348,644

(22) Filed: Jan. 21, 2003

(65) Prior Publication Data

US 2004/0141836 A1 Jul. 22, 2004

(51) Int. Cl.[7] .............................................. F01D 25/16
(52) U.S. Cl. ............................ 415/1; 415/28; 415/144
(58) Field of Search .............................. 415/1, 26, 28, 415/121.2, 144, 145, 146, 147, 156

(56) References Cited

U.S. PATENT DOCUMENTS

| 2,973,136 A | * | 2/1961 | Greenwald .................. 415/113 |
| 3,090,544 A | | 5/1963 | Woollenweber, Jr., et al. |
| 5,131,807 A | * | 7/1992 | Fischer et al. ........... 415/121.2 |
| 5,921,683 A | | 7/1999 | Merritt et al. |

FOREIGN PATENT DOCUMENTS

| EP | 0 212 091 A1 | 3/1987 |
| EP | 0 317 398 A1 | 5/1989 |
| GB | 947025 | 8/1962 |
| GB | 1 204 734 | 6/1967 |
| GB | 2 064 656 A | 6/1981 |

OTHER PUBLICATIONS

European Search Report, May 24, 2004

* cited by examiner

Primary Examiner—Edward K. Look
Assistant Examiner—Richard A Edgar
(74) Attorney, Agent, or Firm—Carlson, Gaskey & Olds

(57) ABSTRACT

A compressor assembly comprises a compressor having a rotor comprising a shaft with fan blades for compressing air. An air bearing serves to cool the shaft of the rotor. A compressor air inlet receives air for the fan blades, which is then exhausted from the fan blades out a compressor air outlet. An air flow path communicates air from the compressor air inlet to the air bearing. A valve controls the flow of air through the air flow path and has an open position permitting air through the air flow path and a closed position restricting air to the path.

20 Claims, 4 Drawing Sheets

SELF-ACTUATED BEARING COOLING FLOW SHUT-OFF VALVE

BACKGROUND OF THE INVENTION

This invention relates to a shut-off valve for an air bearing of an aircraft boost compressor.

A boost compressor supplies pressurized air to various systems of an aircraft. The boost compressor receives engine bleed air through an intake and compresses this air through a compressor rotor, which then supplies the compressed air to the system requiring pressurized air. The boost compressor is typically powered by a turbine that is driven by engine bleed air received by the other end of the boost compressor. The turbine rotor is attached to the same shaft as the compressor rotor. Engine bleed air passes over the turbine rotor causing the shaft and accordingly the compressor rotor to spin.

The shaft of the compressor rotor is cooled by an air bearing. Air is supplied to the air bearing through an air flow path that winds its way from the compressor inlet through various mechanical components to the air bearing. To avoid contaminating the air bearing, air received through the compressor air inlet is filtered by a J-tube air filter, which receives a portion of air received by the compressor air inlet. The J-tube filters out particles that may also flow with the air received by the compressor air inlet.

For certain applications, the boost compressor may be used infrequently and lay dormant for a fair amount of time. For example, the boost compressor may be used with an onboard inert gas generation system. This system provides inert gas to the fuel tanks of an aircraft, which serves to prevent fire in the fuel tanks. The system receives air from an air separation module and depletes the air of oxygen, leaving a nitrogen or inert gas enriched air to be fed to the fuel tanks.

To function properly, the air separation module requires air to be passed through at a certain air pressure. While this air pressure is normally supplied by bleed air from the engine of the aircraft, there are instances where the air pressure is insufficient for the air separation module to work properly. In such instances, such as a rapid aircraft descent, the boost compressor provides the onboard inert gas generation system with compressed air. Typically, the boost compressor does so infrequently.

As a consequence, the boost compressor is susceptible to problems caused by its dormancy. First, while dormant, contaminated air may flow through the J-tube of the boost compressor and into the air bearings, thereby leading to compressor malfunction. While the J-tube limits some of the contamination, it is insufficient to serve as an air filter at the very low flow rates that occur when the boost compressor is not operating.

In addition, particulates may accumulate in the ductwork leading into the compressor inlet during long periods of inactivity. When the boost compressor starts up, these particulate may suddenly overload the J-tube as an air filter. Consequently, these particulates may contaminate the air bearing.

A need therefore exists to address the problem of air bearing contamination that results from infrequent use of the boost compressor.

SUMMARY OF THE INVENTION

Like existing compressor assemblies, the inventive compressor assembly has a compressor with a rotor comprising a shaft with fan blades for compressing air. An air bearing serves to cool and/or support the shaft. Air is received by the compressor through a compressor air inlet and exhausted out by a compressor air outlet. An air flow path receives a portion of air received by the compressor air inlet and directs this air to the air bearing. In contrast to existing compressor assemblies, however, the inventive compressor assembly employs a valve to control the flow of air from the compressor air inlet to the air flow path so that air passes to the air bearing when air received by the compressor air inlet and J-tube is likely to be clean. In this way, the valve prevents contaminated air from entering the air flow path and the air bearing.

The valve may open following the start up of the compressor. The valve may also open based upon a predetermined amount of pressure from the compressor air outlet, such as when the compressor is fully operational. In both instances, the compressor is then permitted to clear contaminated air out before air is sent to the air bearing.

The valve may be sensitized to pressure from the compressor air outlet and may comprise a valve member received in a valve housing in which the valve member moves between an opened and closed position based on compressor air outlet pressure. Moreover, the valve housing may have a chamber open to the air flow path, which may have an opening to receive air from the compressor air inlet. Hence, the valve member may block this opening when in the closed position and unblock the opening when in the open position.

The valve housing may also have a chamber in communication with the compressor air outlet. The predetermined amount of pressure from the compressor outlet in the chamber may then cause a valve member to move to the open position. A spring may bias the valve member to the closed position. In addition, an air filter may receive air from the compressor air inlet and feed this air to the air flow path and air bearing. The air filter may comprise a J-tube.

The inventive compressor assembly accordingly prevents contaminated air from entering the air bearing through a valve that opens when the compressor has flushed out contaminated air. Because the valve may be tied to compressor air outlet pressure, the valve is self-actuated and requires no electronic components to operate.

BRIEF DESCRIPTION OF THE DRAWINGS

The various features and advantages of this,invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
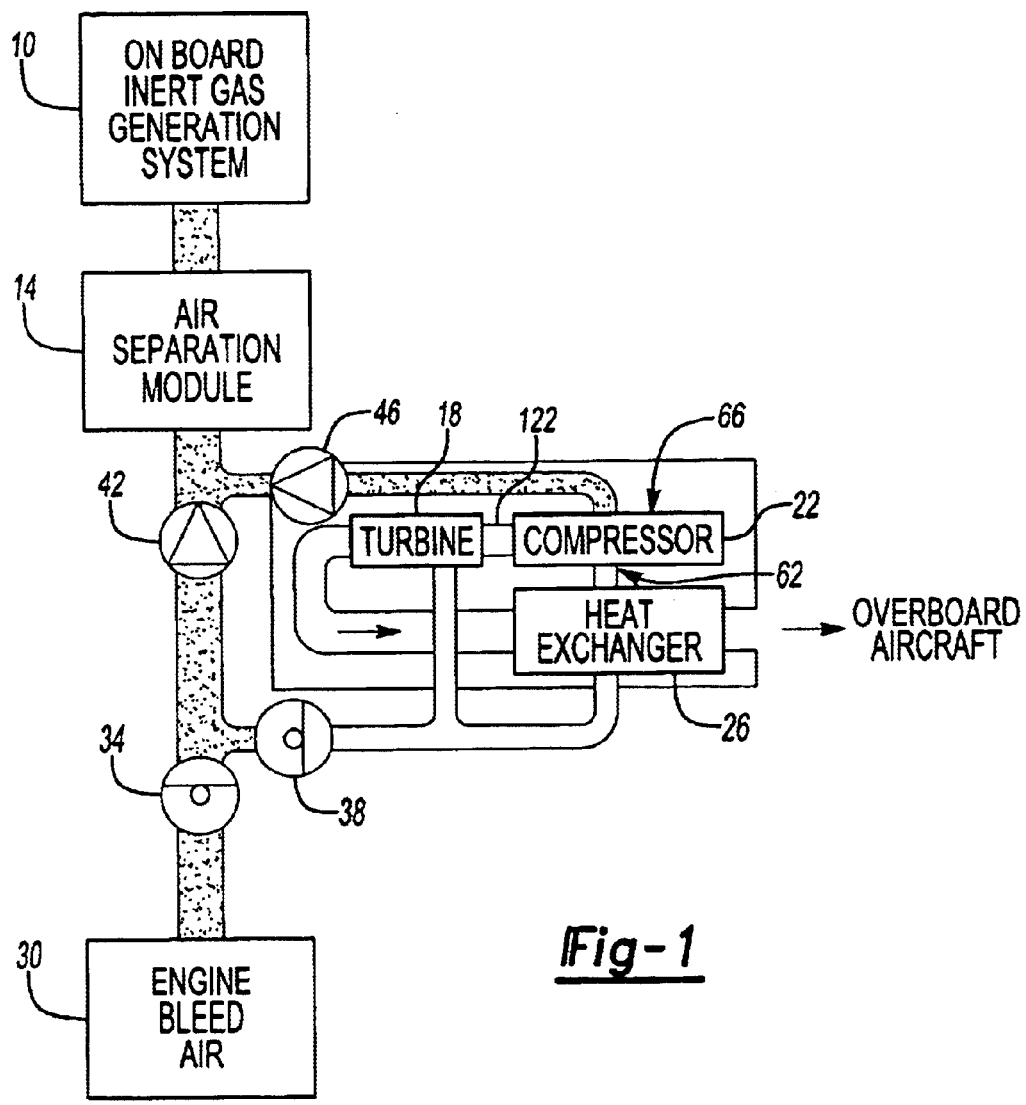
FIG. 1 illustrates a schematic view of the inventive compressor assembly as employed with an onboard inert gas generation system.

FIG. 1 illustrates a schematic view of inventive compressor assembly 22 in relation to onboard inert gas generation system 10. As known, bleed air from an aircraft engine, such as a gas turbine engine, passes through the onboard inert gas generation system shut-off valve 34 through boost compressor bypass check valve 42 to air separation module 14, which then passes separated air to onboard inert gas generation system 10. Normally, air pressure of engine bleed air 30 is sufficient for air separation module 14 so that onboard inert gas generation system 10 may supply inert gas to an aircraft fuel tank as known. However, when bleed air pressure from the engine is insufficient, compressor 22 supplies needed air pressure.

In such an instance, boost compressor shut-off valve 38 is opened permitting engine bleed air 30 to travel to turbine 18 and compressor 22. Engine bleed air 30 provides turbine 18 with power to turn compressor 22 through shaft 122 thereby powering compressor to compress engine bleed air 30. Air from turbine 18 is passed through heat exchanger 26 overboard an aircraft. Compressor 22 receives engine bleed air 30 at compressor inlet 62. After compression, compressor 22 passes compressed air out of compressor air outlet 66 through boost compressor check valve 46, which then passes through air separation module 14 to onboard inert gas generation system 10. This environment for inventive compressor 22 is well-known.

Figure 2:
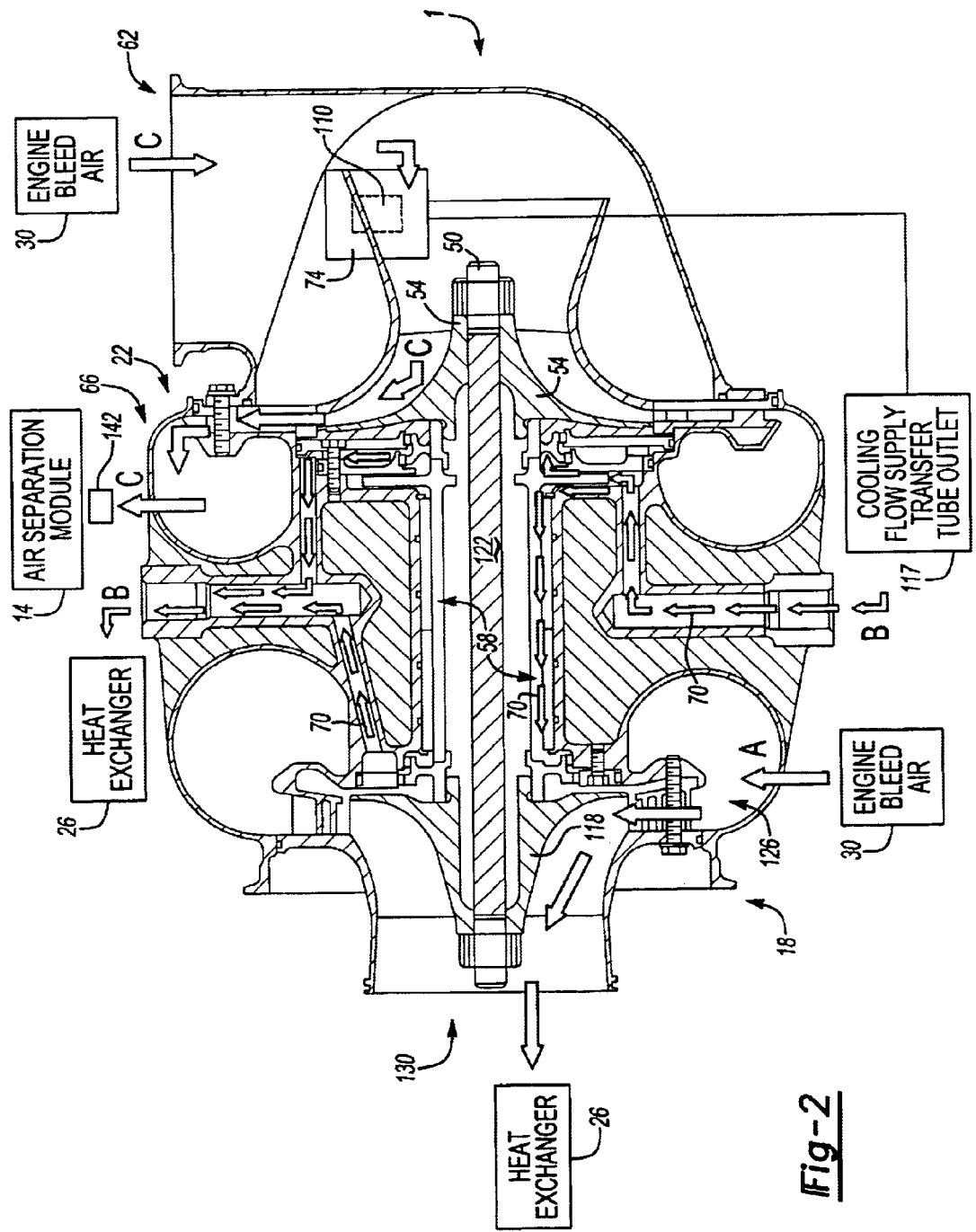
FIG. 2 illustrates a cross-sectional view of the inventive compressor assembly showing compressor, compressor air inlet, valve, air flow path, air bearing and compressor air outlet.

FIG. 2 illustrates a cross-sectional view of compressor 22 and turbine 18. Air is received by turbine inlet 126 along a path and passed through turbine rotor 118, causing shaft 122 to spin as engine bleed air 30 is exhausted out turbine outlet 130. Rotation of shaft 122 causes compressor rotor 50 to spin in the same direction, thereby turning fan blades 54 of compressor rotor 50. Engine bleed air 30 received by compressor air inlet 62 is drawn and compressed by fan blades 54 of rotor 50. Compressed engine bleed air 30 then passes to compressor air outlet 66, which communicates this air through air separation module 14 to onboard inert gas generation system 10. Shaft 122 may spin at a high velocity requiring air bearing 58 to provide cooling as well as support to shaft 122. Air flow path 70 receives air from compressor inlet 62 and channels this air along path B to air bearing 58, thereby permitting air bearing 58 to cool and support shaft 122. Air flow path 70 then guides air to heat exchanger 26 overboard aircraft.

Air for air flow path 70 is supplied by a cooling flow supply transfer tube outlet 117, which receives this air from air filter 110, a J-tube disposed within compressor air inlet 62, which serves to filter engine bleed air 30 of certain particulates. However, air filter 110 maybe insufficient to provide air bearing 58 with clean air. At low air flow rates, such as when compressor 22 is not operated, air filter 110 may fail to eliminate particulates from air received by compressor air inlet 62. In addition, particulates may build upstream of inlet 62 during long periods of dormancy that may overload air filter 110 at compressor 22 start-up.

Accordingly, inventive compressor 22 has valve 74 that controls the supply of engine bleed air 30 to cooling flow supply transfer tube outlet 117 and air flow path 70 and ultimately to air bearing 58. Valve 74 operates to open the supply of air to air flow path 70 at a point when engine bleed air 30 is largely free of particulates, such as after compressor 22 starts up, or when the speed of engine bleed air 30 through compressor 22 is sufficiently fast for air filter 110 to function properly. In this way, contaminated engine bleed air 30 is passed out of compressor air outlet 66 and when engine bleed air 30 is generally free of these contaminants does valve 74 permit this air to travel to air flow path 70 and to air bearing 58.

Figure 3:
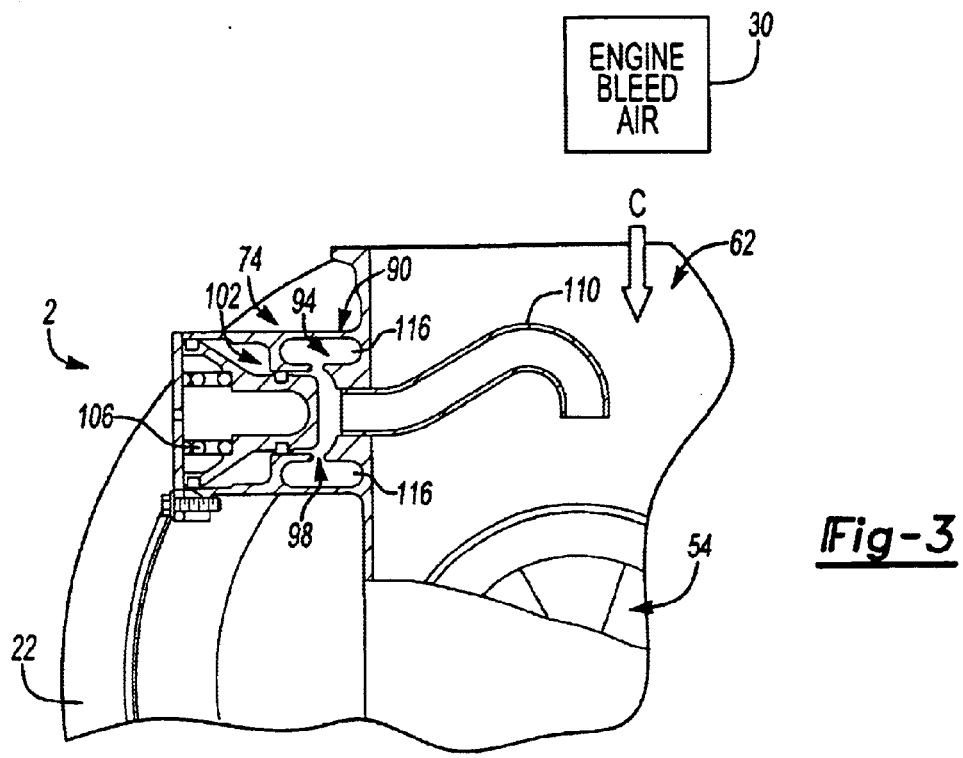
FIG. 3 illustrates a cross-sectional view of FIG. 2, illustrating valve and J-tube air filter in the direction of arrow 1 of FIG. 2.
Figure 4:
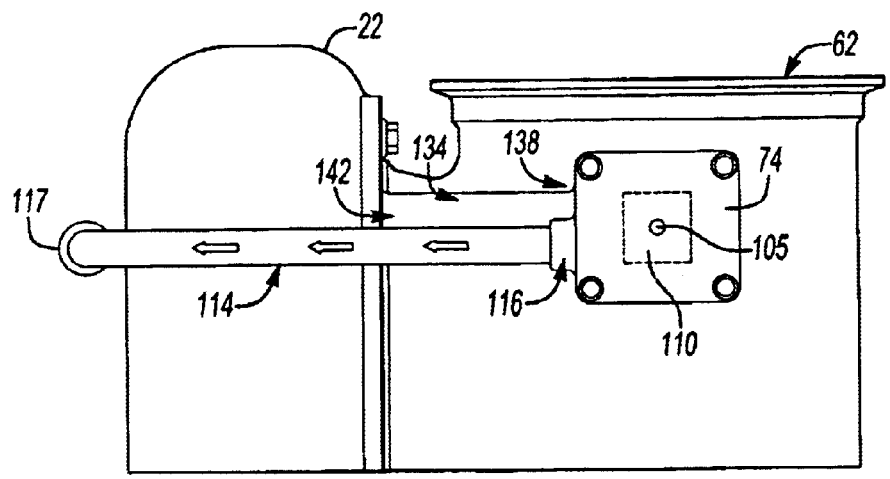
FIG. 4 illustrates an alternative view of valve and compressor in the direction of arrow 2 of FIG. 3.

Valve 74 functions automatically through particularly distinctive features as illustrated by FIG. 3. Specifically, FIG. 3 illustrates a side cross-sectional view of valve 74 and air filter 110 in relation to compressor 22 as shown in the direction of arrow 1 of FIG. 2. As previously explained, engine bleed air 30 travels along path C into compressor air inlet 62. While the majority of engine bleed air 30 passes to fan blades 54 of compressor 22, a portion of this air is received by air filter 110, here a J-tube, which then communicates this air to valve 74. When in the open position as shown in FIG. 3, valve 74 permits engine bleed air 30 to travel through opening 98 of chamber 94, which is in communication with cooling flow supply transfer tube inlet 116, which passes air along cooling flow supply transfer tube 114 to cooling flow supply transfer flow outlet 117 and ultimately to flow path 70 as shown in FIG. 2 and FIG. 4.

Figure 5:
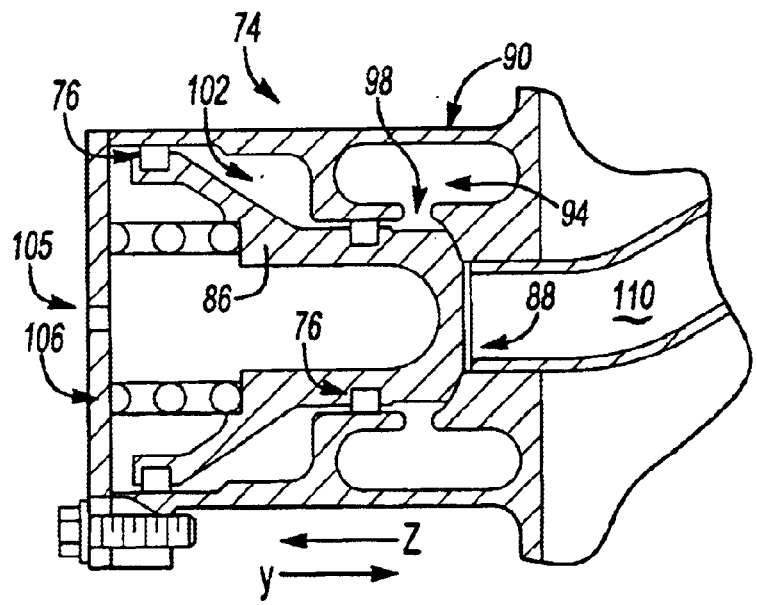
FIG. 5 illustrates valve in the same view as FIG. 3 in a closed position.
Figure 6:
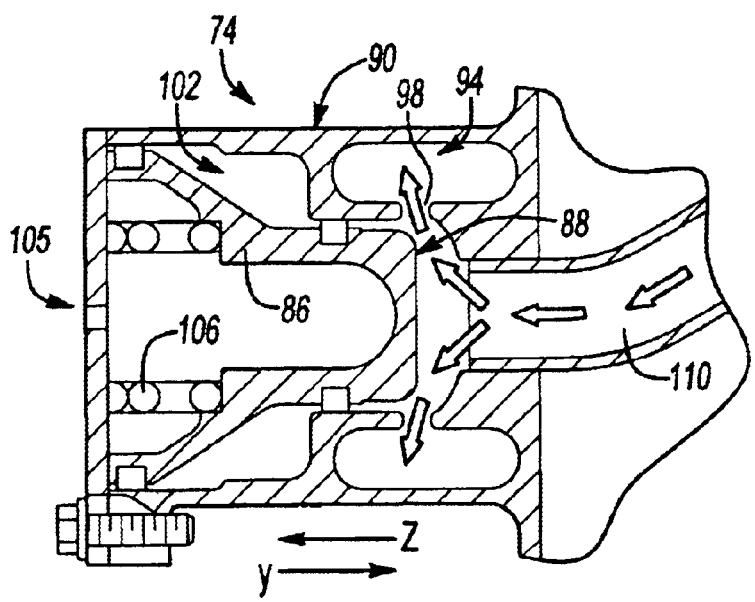
FIG. 6 illustrates the valve of FIG. 5 in an open position.

FIG. 5 and FIG. 6 illustrates valve 74 in the closed and open positions, respectively. As shown in FIG. 5, when compressor 22 is dormant, valve 74 is in a closed position. Valve 74 comprises valve housing 90, which receives valve member 86 having valve poppet 88. Valve housing 90 further has two chambers, chamber 94 which is in communication with cooling flow supply transfer lube inlet 116 and chamber 102, which is in communication with compressor sensing tube 134 and compressor sensing tube outlet 138. Piston rings 76 surround valve member 86 to limit the communication of air between chamber 94 and chamber 102. Compressor sensing tube 134 receives a portion of compressed air from compressor 22 through compressor sensing tube air inlet 142. When compressor 22 is non-operational, valve member 86 is biased in the closed position by spring 106. In addition, ambient air enters hole 105 of valve housing 74 so that ambient air assist valve member 86 in staying in the closed position. In this position, valve poppet 88 serves to prevent air from air filter 110 from entering opening 98 of chamber 94 and thereby shutting off air to air flow path 70 and ultimately to air bearing 58.

Because air bearing 58 contamination is likely to occur at compressor 22 start up or while compressor 22 remains dormant, valve 74 remains in the closed position as shown in FIG. 5, thereby preventing the communication of contaminated air to air flow path 70 and air bearing 58. However, following compressor 22 start up, contaminants and engine bleed air 30, which have built up during the dormancy of compressor 22, are allowed to pass through compressor air inlet 62 through compressor rotor 50 and out compressor air outlet 66. As pressure builds at compressor air outlet 66 during compressor 22 start up, this air pressure is communicated through compressor sensing tube inlet 142 through compressor sensing tube 134 to compressor sensing tube outlet 138 and to chamber 102. Pressure within chamber 102 increases and overcomes the resistance of spring 106, as shown in FIG. 6, causing valve member 86 to move in the direction of arrow Z. When compressor 22 is shutoff, pressure in chamber 102 decreases, permitting spring 106 to close valve 74 and move valve member 86 axially along arrow Y to the closed position shown in FIG. 5. In this open position, air through air filter 110 passes through opening 98 of chamber 94 and ultimately to air flow path 70. The bias of spring 106 should be sufficient so that valve member 86 remains closed until sufficient pressure has built up at compressor air outlet 66 and ultimately chamber 102 so that most contaminants will have passed through compressor 22 before air is communicated from air filter 110 to air flow path 70 and air bearing 58. In this way, valve 74 keeps contaminants from flowing to air flow path 70 and air bearing 58 during those moments when contaminants are most likely to invade air bearing 58 and also opens air flow to air flow path 70 and air bearing 58 when such contaminants have been cleared.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A compressor assembly, comprising:
   a compressor having a rotor comprising a shaft with fan blades for compressing air;
   an air bearing for cooling said shaft;
   a compressor air inlet for receiving air for said fan blades;
   a compressor air outlet for exhausting air from said fan blades;
   an air flow path communicating air from said compressor air inlet to said air bearing; and
   a valve in communication with said air flow path, having an open position permitting air through said air flow path and a closed position restricting air through said air flow path.

2. The compressor of claim 1 wherein said valve opens following start-up of said compressor.

3. The compressor of claim 1 wherein said valve actuates based upon a predetermined amount of pressure from said compressor air outlet.

4. The compressor of claim 3 wherein said valve is in communication with said compressor air outlet.

5. The compressor of claim 4 wherein said valve comprises a valve member received in a valve housing, said valve member actuable between said open position and said closed position.

6. The compressor of claim 5 wherein said valve housing comprises a chamber in communication with said air flow path, having an opening to receive air from said compressor air inlet.

7. The compressor of claim 6 wherein said valve member blocks said opening in said closed position and unblocks said opening in said open position.

8. The compressor of claim 5 including a chamber in communication with said compressor air outlet.

9. The compressor of claim 8 wherein said predetermined amount of pressure from said compressor outlet within said chamber causes said valve member to move to said open position.

10. The compressor of claim 5 including a spring biasing said valve member to said closed position.

11. The compressor of claim 1 including an air filter receiving air from said compressor air inlet.

12. The compressor of claim 11 wherein said air filter comprises a J-shaped tube.

13. A compressor assembly, comprising:
    a compressor having a rotor comprising a shaft with fan blades for compressing air;
    an air bearing for cooling said shaft;
    a compressor air inlet for receiving air for said fan blades;
    a compressor air outlet for exhausting air from said fan blades;
    an air flow path communicating air from said compressor air inlet to said air bearing;
    a J-shaped-tube in communication with said compressor air inlet; and
    a valve in communication with said J-shaped tube and with said air flow path, having an open position permitting air through said air flow path and a closed position restricting air through said air flow path wherein said valve actuates based upon a predetermined amount of pressure from said compressor air outlet.

14. The compressor of claim 13 wherein said valve comprises a valve member received in a valve housing, said valve member actuable between said open position and said closed position.

15. The compressor of claim 14 wherein said valve housing comprises a chamber in communication with said air flow path, having an opening to receive air from said compressor air inlet.

16. The compressor of claim 15 wherein said valve member blocks said opening in said closed position and unblocks said opening in said open position.

17. The compressor of claim 14 including a chamber in communication with said compressor air outlet.

18. The compressor of claim 17 wherein said predetermined amount of pressure from said compressor outlet within said chamber causes said valve member to move to said open position.

19. The compressor of claim 14 including a spring biasing said valve member to said closed position.

20. A method of controlling air flow to an air bearing, comprising the steps of:
    rotating a fan blade of a compressor on an air bearing, the compressor having a compressor air input and a compressor air output;
    receiving a portion of air from the compressor air input to the air bearing; and
    communicating the portion of the air from the compressor air input to the air bearing when the compressor air output reaches a predetermined pressure level.

* * * * *